United States Patent Office 2,910,402
Patented Oct. 27, 1959

2,910,402

COMPOSITIONS AND METHODS FOR DESTROYING INSECTS

Homer E. Fairchild, Wilmington, Del., assignor to E. I. du Pont de Nemours and Company, Wilmington, Del., a corporation of Delaware No Drawing. Application February 21, 1958
Serial No. 716,545

6 Claims. (Cl. 167—30)

This invention relates to esters of chloromethylphosphonothioic acid, and more particularly to insecticidal compositions and methods containing these esters.

It has been found that certain esters of chloromethylphosphonothioic acid have outstanding insecticidal activity, particularly for the control of aphids, mites and household pests. These compounds are characterized by having a broad spectrum of insecticidal activity, relatively low mammalian toxicity and physical characteristics that make them easy to formulate. The balance between the relatively low mammalian toxicity and a broad spectrum of pesticidal activity makes these compounds ideally suited for many applications. For example, they are well suited for application to growing crops for the control of aphids and mites.

The esters that have been found to possess this outstanding combination of properties are represented by the formula (1)

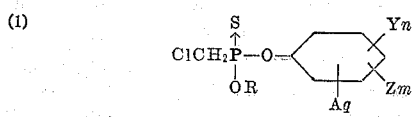

wherein R is an alkyl group containing less than five carbon atoms, that is 1, 2, 3 or 4 carbon atoms; Y is nitro; Z is chlorine; A is methyl; $n$ is an integer from 0 through 2, that is 0, 1 or 2; $m$ is an integer from 0 through 3, that is 0, 1, 2 or 3; $q$ is an integer of 0 or 1; $n+m$ is from 1 through 3, that is 1, 2 or 3; and $n+m+q$ is also from 1 through 3, that is the phenyl ring contains 1, 2 or 3 substituents.

The alkyl aryl chloromethylphosphonothioates of this invention are suitably prepared by a two-step process. This process is illustrated below with particular reference to the preparation of ethyl p-nitrophenyl chloromethylphosphonothioate. However, it is to be understood that by suitable choice of reactants the other phosphonate esters useful in the present invention are similarly prepared.

In the first step, sodium ethylate is reacted with chloromethylphosphonothionyldichloride to give ethyl chloromethylphosphonothionylmonochloride. In the second step, this intermediate is reacted with sodium p-nitrophenate to give the product. The reactions are:

(2)

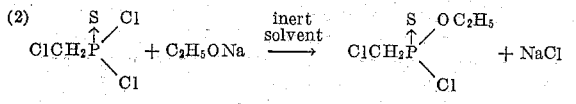

(3)

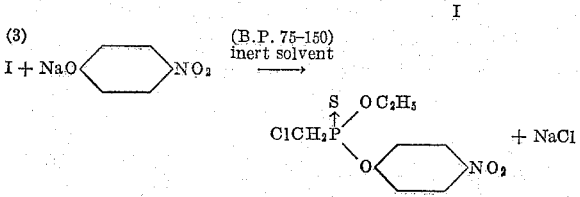

The first step of the reaction, as illustrated in Equation 2, proceeds readily at room temperature. Instead of using sodium ethylate or similar reactants, ethanol or another lower alcohol can be used. If an alcohol is used instead of a sodium alcoholate, then a hydrogen chloride acceptor, such as pyridine, is also used in the reaction. The reaction of Equation 2 is suitably effected in the presence of an inert solvent such as benzene or chlorobenzene.

The reaction illustrated in Equation 3 is preferably carried out at an elevated temperature such as 100–150° C. in the presence of an inert solvent. Chlorobenzene is particularly suitable as a solvent because of its convenient boiling point since the reaction can be carried out at atmospheric pressure in the presence of chlorobenzene by refluxing at a temperature of about 130° C.

The products thusly prepared are recovered from the reaction mass of Equation 3 by filtering off the insoluble sodium chloride and distilling off the solvents. These products are oily liquids having a light yellow color and are obtained in good yield. While the product so obtained is not highly refined, analysis of it conforms closely to the calculated value. Further refinement of the product is difficult because it is not easily distilled, nor is crystallization readily induced by cooling. Nevertheless, the product so obtained is in a form highly suited for use in the insecticidal compositions and methods of the present invention.

The chloromethylphosphonothionyldichloride used as a reactant in Equation 2 can be prepared by the reaction of phosphorous trichloride and thioformaldehyde in accordance with conventional techniques. The chloromethylphosphonothionyldichloride reactant can also be prepared by the method of M. I. Kabachnik and N. N. Godovikov, Doklady Akad. Nauk. S.S.S.R. 110, 217–9 (1956) wherein the chloromethylphosphonic dichloride is reacted with $P_4S_{10}$ to give the corresponding thioic dichloride.

The insecticidal compositions of the present invention are prepared by admixing one or more of the esters of Formula 1 with suitable insecticidal adjuvants to provide compositions in the form of solids, dusts, water-dispersible powders and aqueous dispersions or emulsions.

By the term "insecticidal adjuvant," I mean a substance which is capable of presenting or aiding in the presentation of an insect toxicant to an insect. The term "adjuvant" is well-established in the art where it is recognized that an active agent or toxicant is in itself of little practical utility for combatting insects unless it be presented in a form for effecting intimate contact of the agent or its vapors, as the particular case may require, with the insect. Thus additional material or materials are employed in the formulation of an active agent to yield a suitable insecticidal composition, such materials being adjuvants.

Insecticidal adjuvants such as the dusts, solvents, wetting, dispersing and emulsifying agents set out in the United States Patent 2,426,417 may be employed in the preparation of the insecticidal compositions of the present invention. Other wetting, dispersing, and emulsifying agents, such as those listed in detail in Bulletin E-607 of the Bureau of Entomology and Plant Quarantine of the U.S. Department of Agriculture and such as those set out in an article by McCutcheon in "Soap and Chemical Specialities," volume 31, Nos. 7–10 (1955), entitled "Synthetic Detergents and Emulsifiers," may also be used.

Preferably the compositions of the invention are in the form of "concentrates" suitable for dispersion in water to give aqueous spray compositions. A suitable emulsifiable oil concentrate is obtained, for example, by adding a dispersing or emulsifying agent to an ester of Formula 1. Preferably the dispersing or emulsifying agent is one which is soluble in the compound and ordinarily the agent will not comprise more than 10% by weight of the emulsifiable oil composition and with the better adjuvant materials, the percentage will be 5% or less.

Less concentrated emulsifiable oil concentrates are prepared by dissolving an ester of Formula 1 and a wetting, dispersing, and emulsifying agent in a suitable solvent. Care should be taken, however, in the selection of a solvent if the composition is to be applied to foliage since, as those skilled in the insecticide art know, many of the common solvents tend to injure plants.

Dust compositions of the invention contain an ester of Formula 1 adsorbed on finely divided carriers or dusts such as talc, pyrophyllite, natural clays, diatomaceous earths, and other powdered diluents such as those set out in the aforementioned U.S. patent.

The dust compositions of the invention are prepared by mixing intimately the liquid ester of Formula 1 with the powdered carrier. Alternatively, the toxic compound may be dissolved in a volatile solvent such as acetone and the solution thus obtained then mixed with the powdered carrier and the solvent subsequently removed from the composition by evaporation.

The maximum concentration of the toxicant in the dust composition or water-dispersible powder will, of course, vary with the adsorptivity of the particular powdered diluent used. For example, if fuller's earth is used, the dust may contain as much as about 40% of the liquid toxicant. Using a less adsorptive diluent such as pyrophyllite, however, it is necessary to reduce the content of the liquid toxicant appreciably in order to obtain a free-flowing powdered insecticidal composition.

Preferred water-dispersible powders of the invention contain in the order of about 35% by weight of an ester of Formula 1 dispersed in a highly adsorbent powdered diluent such as fuller's earth or diatomaceous earth. Such water-dispersible powders also contain an effective amount of a dispersing or emulsifying agent. Bentonite is well-suited as a dispersing agent for this purpose.

In actual application of the compositions for insect control, it is generally preferred that the toxicant be present in relatively low concentrations. For example, if application of the composition is to be made to vegetation or agricultural crops, the emulsifiable oil concentrate or water-dispersible powdered compositions described above are preferably dispersed in water to obtain aqueous suspensions or emulsions of suitable concentration.

In applying the compounds of the invention for the control of insects they are, of course, applied in amount sufficient to exert an insecticidal action. In normal usage, such as in applications of the compositions to agricultural crops for the control of insects, the toxicant is suitably applied at a concentration of from 0.005 to about 1.0%. More preferably, if the treatment is made for the control of insects by spraying an aqueous emulsion of an emulsifiable oil concentrate or an aqueous dispersion of a concentrated water-dispersible powder of the type previously described, the concentration of the toxicant in the spray composition is from about 0.005 to 0.5%.

The toxicant is applied either as a spray or a dust to the locus or area to be protected. Such application may be made directly upon the locus or area or the insects thereon during the period of infestation or alternatively, the material may be otherwise applied so that the insects will come into contact with the toxic residue and be killed.

The compositions of the invention may include fungicides such as zinc dimethyl dithiocarbamate, zinc ethylene bis-dithiocarbamate, and manganese ethylene bis-dithiocarbamate; insecticides such as DDT, 2,2,-bis(p-methoxyphenyl)-1,1,1-trichloroethane (methoxychlor), and 1,2,4,5,6,7,8,8 - octachloro - 4,7 - methane - 3a,4,7,7a- tetrahydroindane (chlordane); and other fungicides and insecticides such as those set out in U.S. Patent 2,426,417.

The invention is illustrated by the following examples:

Example 1

Over a period of about ½ hour, 46 grams of absolute ethanol is added dropwise to a stirred mixture of 183.5 grams of chloromethylphosphonothionyldichloride and 80 grams of pyridine in 400 ml. of dry benzene while applying external cooling to maintain the reacting mass at about room temperature.

After completing the addition of absolute ethanol, the mixture is stirred for several hours at about room temperature and then poured into ice water. The benzene layer is washed several times with water and finally dried over anhydrous sodium sulfate. The benzene solvent is removed by distillation under reduced pressure at temperatures not exceeding 35–40° C. There is obtained, as a residue, a colorless oil which is predominantly ethyl chloromethylphosphonothionylmonochloride.

Ninety-six grams of this crude oil is then mixed with 80 grams sodium p-nitrophenate in 300 ml. chlorobenzene, and the mixture is stirred at reflux temperature until the reddish color of the sodium phenate disappears. The reaction mass is then cooled to room temperature and filtered to remove the suspended sodium chloride. Removal of the solvent under reduced pressure at 100° yields an amber-colored oil which is a crude product containing a high proportion of ethyl p-nitrophenyl chloromethylphosphonothioate. A typical crude product has an index of refraction of $n_D^{25} = 1.5682$ and the following analysis:

Calculated: P, 10.5; N, 4.74. Found: P, 10.98; N, 4.38.

The crude product, without additional purification, is suitable for formulating into conventional insecticidal compositions.

Example 2

Over a period of about one hour a mixture of 60 grams of n-propanol and 105 grams of triethylamine is added dropwise to a stirred mixture of 183.5 grams of chloromethylphosphonothionyldichloride in 500 ml. of dry benzene, maintaining the temperature at about room temperature by external cooling. After stirring at room temperature for an additional hour, 173.5 grams of 4-chloro-2-nitrophenol is added over a period of a few minutes. Then 101 grams of triethylamine is added dropwise over a period of about an hour, maintaining the temperature at about 40° C. by external cooling. Finally the mixture is refluxed for about fifteen minutes and then is cooled to room temperature. The reaction mixture is added to water, and the separated benzene layer is washed several times with water. After drying the benzene solution over sodium sulfate, the solvent is removed under reduced pressure at 100° C., leaving a viscous amber oil residue, which is composed predominantly of propyl 4-chloro-2-nitrophenylchloromethylphosphonothioate. Additional purification is not necessary for formulation as an insecticidal composition.

Examples 3–25

The following compounds of Formula 1 are prepared in accordance with the procedure of Examples 1 and 2 by substituting for the reactants of Examples 1 and 2 molecular equivalent amounts of the appropriate alcoholate and substituted phenate to give the desired product:

3. Methyl p-nitrophenyl chloromethylphosphonothioate
4. n-Propyl p-nitrophenyl chloromethylphosphonothioate
5. Isopropyl p-nitrophenyl chloromethylphosphonothioate
6. Isobutyl p-nitrophenyl chloromethylphosphonothioate
7. Methyl o-nitrophenyl chloromethylphosphonothioate
8. Ethyl o-nitrophenyl chloromethylphosphonothioate
9. n-Butyl o-nitrophenyl chloromethylphosphonothioate
10. Ethyl m-nitrophenyl chloromethylphosphonothioate 11. Isopropyl m-nitrophenyl chloromethylphosphonothioate
12. Methyl 4-chloro-2-nitrophenyl chloromethylphosphonothioate
13. Ethyl 4-chloro-2-nitrophenyl chloromethylphosphonothioate
14. Ethyl 3-chloro-4-nitrophenyl chloromethylphosphonothioate
15. n-Propyl 3-chloro-4-nitrophenyl chloromethylphosphonothioate
16. Ethyl p-chlorophenyl chloromethylphosphonothioate
17. Ethyl 2,4,5-trichlorophenyl chloromethylphosphonothioate
18. Isobutyl 2,4,5-trichlorophenyl chloromethylphosphonothioate
19. Ethyl 2,4-dinitrophenyl chloromethylphosphonothioate
20. Ethyl 3,5-dinitrophenyl chloromethylphosphonothioate
21. Ethyl 2,5-dichlorophenyl chloromethylphosphonothioate
22. Methyl 4,6-dinitro-2-methylphenyl chloromethylphosphonothioate
23. Ethyl 4,6-dinitro-2-methylphenyl chloromethylphosphonothioate
24. Ethyl 4-chloro-3-methylphenyl chloromethylphosphonothioate
25. Ethyl 2-nitro-4-methylphenyl chloromethylphosphonothioate

*Example 26.—Water-dispersible aphicidal powder*

A water-dispersible insecticidal powder is obtained by admixing ethyl p-nitrophenylchloromethylphosphonothioate (prepared as in Example 1) with finely divided bentonite and finely divided fuller's earth in the following proportions by weight:

| | Percent |
|---|---|
| Ethyl p-nitrophenyl chloromethylphosphonothioate | 25 |
| Bentonite | 8 |
| Fuller's earth | 67 |

The composition of this example is then dispersed in water in the proportion of 32 oz. of the composition per 100 gallons of water. When sprayed on apple trees, outstanding control of aphids is obtained.

*Example 27.—Insecticidal dust composition*

An insecticidal dust is prepared by admixing ethyl o-nitrophenylchloromethylphosphonothioate with talc in the proportions of about 30 parts by weight for each part by weight of the phosphonothioate.

This dust composition, when dusted over plants, gives excellent protection from infestation by mites and insects.

*Example 28.—Insecticidal emulsifiable oil concentrate*

An emulsifiable composition of methyl 3-chloro-4-nitrophenylchloromethylphosphonothioate, which, upon addition of water, forms emulsions useful in the control of cotton insects, may be made according to the following examples:

| | Parts |
|---|---|
| Methyl 3-chloro-4-nitrophenyldibromomethylphosphonothioate | 1 |
| Emcol H 77 emulsifier (a blend of polyalcohol carboxylic acid esters and sulfonated oils) | 1 |

This oil composition, when diluted with 11 parts of water per part of oil composition, gives effective control of cotton boll weevil when sprayed on an infested cotton field with a ground rig at the rate of 3 gallons per acre.

*Example 29.—Granular fly bait*

A formulation consisting of crude ethyl 2,4,5-trichlorophenylchloromethylphosphonothioate, prepared as indicated previously, and granular sugar in intimate mixture provides effective fly control. A mixture consisting of 2% of this compound homogeneously dispersed on coarse granular sugar as a carrier, gives effective control of flies when scattered around a barn with a high house fly population.

*Example 30.—Aerosol oil formulation*

A formulation of methyl p-nitrophenylchloromethylphosphonothioate may be employed with an aerosol fog generator, for effective mosquito control application. The following composition can be used in aerosol fogging machines over a swampy area for effective control of both the adult and larvae of the mosquito.

| | Percent |
|---|---|
| Methyl p-nitrophenylchloromethylphosphonothioate | 5 |
| Fuel oil No. 2 | 95 |

*Example 31.—Aerosol bomb formulation*

When suitably formulated with propellants and other inerts and solvents, ethyl p-nitrophenylchloromethylphosphonothioate may be combined with certain insecticides such as methoxychlor, to provide a mixture suitable for use in a wide variety of applications.

One such mixture may be made by preparing the following concentrate:

| | Percent |
|---|---|
| Deodorized kerosene | 45 |
| Alkylated naphthalene | 30 |
| Methoxychlor | 15 |
| Propyl p-nitrophenylchloromethylphosphonothioate | 10 |

Cooling 68 grams of this concentrate, combining with 272 grams of mixed 50–50 Freon 11-Freon 12, and charging the mixture in a 12-oz. aerosol can results in a spray-bomb which is employed as a direct spray on roses for control of aphids, Japanese beetle and other common insect pests of roses.

*Example 32.—Volatile oil formulation*

A solution of 3% n-butyl 2-nitro-4-methylphenylchloromethylphosphonothioate in deodorized kerosene applied with a brush to appropriate surface areas in a food storage room infested with German roaches, results in a marked decrease in the roach population.

Additional insecticidal compositions of the present invention are prepared in accordance with Examples 26–32 by substituting for the active ingredient in the compositions of Examples 26–32 equivalent weights of the compounds of Examples 3–25.

It will be understood that the terms "insect" and "insecticide" are used herein in their broad common usage to include spiders, mites, ticks, and like pests which are not in the strict biological sense classed as insects. Thus the usage herein conforms to the definitions provided by Congress in Public Law 104, the "Federal Insecticide, Fungicide, and Rodenticide Act" of 1947, Section 2, Subsection h, wherein the term "insect" is used to refer not only to those small invertebrate animals belonging mostly to the class Insecta, comprising six-legged, usually winged forms, as beetles, bugs, bees, flies, and so forth, but also to other allied classes of arthropods whose members are wingless and usually have more than six legs, as spiders, mites, ticks, centipedes, and wood lice.

I claim:

1. A method for killing insects comprising contacting the insects with an insecticidal amount of at least one compound represented by the formula

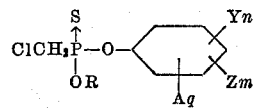

wherein R is an alkyl group containing less than five carbon atoms; Y is nitro; Z is chloro; A is methyl; $n$ is a number from 0–2; $m$ is a number from 0–3; $q$ is a number from 0–1; $n+m$ is a number from 1–3; and $n+m+q$ is a number from 1–3.

2. A method in accordance with claim 1 wherein said compound is ethyl p-nitrophenylchloromethylphosphonothioate.

3. A method for protecting plants from insect attack comprising applying to the plants an insecticidal amount of at least one compound represented by the formula

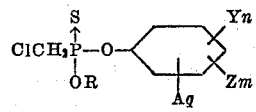

wherein R is an alkyl group containing less than five carbon atoms; Y is nitro; Z is chloro; A is methyl; $n$ is a number from 0–2; $m$ is a number from 0–3; $q$ is a number from 0–1; $n+m$ is a number from 1–3; and $n+m+q$ is a number from 1–3.

4. A method in accordance with claim 3 wherein said compound is ethyl p-nitrophenylchloromethylphosphonothioate.

5. An insecticidal composition comprising an insecticidal adjuvant and a compound represented by the formula

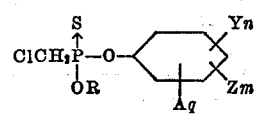

wherein R is an alkyl group containing less than five carbon atoms; Y is nitro; Z is chloro; A is methyl; $n$ is a number from 0–2; $m$ is a number from 0–3; $q$ is a number from 0–1; $n+m$ is a number from 1–3; and $n+m+q$ is a number from 1–3.

6. An insecticidal composition in accordance with claim 5 wherein said compound is ethyl p-nitrophenylchloromethylphosphonothioate.

References Cited in the file of this patent

UNITED STATES PATENTS

| | | |
|---|---|---|
| 2,503,390 | Jelinek | Apr. 11, 1950 |
| 2,579,810 | Fields | Dec. 25, 1951 |
| 2,758,954 | Tidwell | Aug. 19, 1956 |

FOREIGN PATENTS

| | | |
|---|---|---|
| 273,002 | Switzerland | May 16, 1951 |